United States Patent [19]
Radun

[11] Patent Number: 6,018,386
[45] Date of Patent: Jan. 25, 2000

[54] OSCILLATORY, OPTICALLY COUPLED MEASUREMENT SYSTEM

[75] Inventor: Arthur V. Radun, Lexington, Ky.

[73] Assignee: The United States of America as represented by the Secretary of the Air Force, Washington, D.C.

[21] Appl. No.: 09/131,847

[22] Filed: Jul. 3, 1998

[51] Int. Cl.[7] .................................................. G01J 1/00
[52] U.S. Cl. ............................ 356/213; 356/372; 356/373
[58] Field of Search ...................................... 356/213, 372, 356/373

[56] References Cited

U.S. PATENT DOCUMENTS

| | | |
|---|---|---|
| 3,561,253 | 2/1971 | Dorman . |
| 3,653,253 | 4/1972 | Olin . |
| 4,077,700 | 3/1978 | Camphausen . |
| 4,294,513 | 10/1981 | Nelson et al. . |
| 4,300,813 | 11/1981 | Gravel . |
| 4,385,798 | 5/1983 | Yevick . |
| 5,571,945 | 11/1996 | Koutrakis et al. . |

*Primary Examiner*—Frank G. Font
*Assistant Examiner*—Reginald A. Ratliff
*Attorney, Agent, or Firm*—Gerald B. Hollins; Thomas L. Kundert

[57] ABSTRACT

A mechanical oscillator-based physical quantity measurement system is disclosed. The mechanical oscillator is coupled by optical signals to a source of oscillation-sustaining energy and this energy is also time-shared between oscillation sustenance and the generation of oscillation frequency-characterized optical output signals. Measurement of physical quantities including fluidic pressure, electrical current flow, physical acceleration and magnetic field strength is contemplated with the disclosed system.

19 Claims, 7 Drawing Sheets

OSCILLATORY, OPTICALLY COUPLED MEASUREMENT SYSTEM

RIGHTS OF THE GOVERNMENT

The invention described herein may be manufactured and used by or for the Government of the United States for all governmental purposes without the payment of any royalty.

BACKGROUND OF THE INVENTION

This invention concerns the field of physical measurement of parameters such as mechanical magnitudes and electrical amplitudes using an optically coupled sustained oscillatory apparatus. The invention provides means to measure several physical quantities, such as current, flux, pressure, etc., with a low power optical interface and with the enhanced sensitivity of an oscillatory measurement algorithm.

Presently a number of sensors exist for measuring physical quantities, from pressure to electric current. Such conventional electrical and mechanical measurement sensors often connect to a control or monitoring system via electrical wires. Though this arrangement is adequate for many applications, the wire connections pose electrical noise pick up problems in such applications as power electronics, automotive engine controls and accessories, and aircraft engine controls and accessories. These applications are believed potential beneficiaries of a simple optical interface, which is inherently isolated electrically. The type of connection with sensor, an electrical connection for conventional sensors and an optical connection for this new sensor, therefore, provides a distinguishing feature of the present invention from previous approaches. An optical connection is immune to electrical noise unlike an electrical connection. Typical present invention applications also include pressure sensors, accelerometers and current sensors.

SUMMARY OF THE INVENTION

The present invention provides for optically coupled oscillating mechanical member measurement of diverse physical quantities such as fluidic pressure, magnetic field strength and electrical current.

It is an object of the present invention, therefore, to measure a variety of physical parameters using an optically coupled oscillating member measurement arrangement.

It is another object of the invention to provide a sensitive measurement arrangement suitable for use with diverse measurement tasks.

It is another object of the invention to provide a measurement arrangement in which sensitivity is enhanced through use of an oscillation assisted measurement algorithm.

It is another object of the invention to achieve physical measurements through use of a frequency coded measurement signal.

It is another object of the invention to provide a measurement arrangement in which an input optical energy source is time-shared between maintenance of an oscillatory condition and generation of a measurement output signal.

It is another object of the invention to provide a measurement arrangement in which an oscillatory condition is maintained by way of received optical energy.

It is another object of the invention to provide a measurement arrangement in which unusual and desirable measurement sensitivity is achieved by way of modifying an existing oscillatory condition with an input signal to be measured.

It is another object of the invention to provide a measurement arrangement in which either of refractive or reflective optical phenomena may be employed in implementing a sustained mechanical oscillation.

It is another object of the invention to provide a measurement arrangement in which either of refractive or reflective optical phenomena may be employed in implementing an optically based measurement algorithm.

Additional objects and features of the invention will be understood from the following description and claims and the accompanying drawings.

These and other objects of the invention are achieved by the optical coupled signal oscillatory method of measuring physical quantity changes between first magnitude and second magnitude values comprising the steps of:

establishing light energy coupled mechanical element oscillations of combined mechanical element physical characteristics and physical quantity to be measured frequency determination;

measuring a change in said mechanical element oscillation frequency caused by change of said physical quantity to be measured between first and second magnitudes thereof; and correlating said measured change of mechanical element oscillation frequency with changes of said physical quantity to be measured according to a predetermined relationship criteria.

DETAILED DESCRIPTION

The present invention involves use of an optically coupled oscillating member to measure one of a group of selected physical quantities. The oscillator used in the invention may be identified as an optical acoustic oscillator, although the oscillation frequency involved need not be limited to the acoustic or audio range of the electromagnetic spectrum. Coupling between the measured quantity, the oscillatory member and the measurement output signal may be accomplished by either optical refraction or optical reflection phenomenon.

The optical acoustic oscillator of the present invention measurement arrangement has a single continuous optical input and a single optical output signal. The intensity of light from the optical output varies with time and has a frequency determined by the vibrating or oscillating mechanical element in the optical acoustic oscillator. The frequency of the output light intensity variation is stable like the frequency of a piezoelectric oscillator. It is believed that an optical acoustic oscillator measurement arrangement, according to the present invention, is applicable to sensors providing the advantage of optical terminals to selected applications. The optical acoustic oscillator is similar to a piezoelectric oscillator in that its frequency of oscillation is determined by the mechanical properties of a vibrating member. In terms of its operation it is somewhat similar in principle to an optical version of a mechanical buzzer or a pendulum, e.g., a cuckoo clock pendulum.

The fundamental components of a present invention optical acoustic oscillator measurement arrangement are a mechanical oscillator, a light steering mechanism driven by the mechanical oscillator, a solar cell, a physical quantity to be measured input signal and an electromechanical actuator. The solar cell and an electromechanical actuator are used to compensate for energy losses in the mechanical oscillator in order that it oscillate indefinitely while the light steering mechanism creates a time varying light output signal at the frequency of the oscillator. The mechanical oscillator is chosen so that its frequency of oscillation is dependent on the physical quantity being measured. A light input to the optical acoustic oscillator measurement arrangement provides an energy medium or carrier for the output signal and also provides energy to accommodate losses occurring in the mechanical oscillator. High Q oscillators are desirable to minimize the light input requirements.

Figure 1:
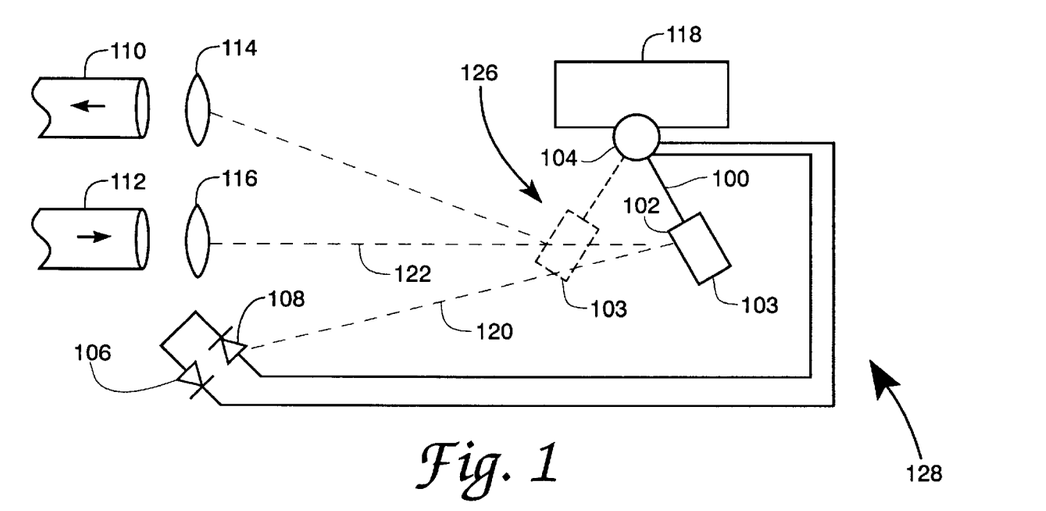
FIG. 1 shows a functional block diagram of an exemplary optical acoustic oscillator measurement system according to the present invention.

The optical acoustic oscillator portion of the present invention may be understood in terms of an example. A simple embodiment of such an oscillator is based on a pendulum oscillating in a gravitational field. In this example the pendulum is the mechanical oscillating element and has a frequency of oscillation determined by gravitational acceleration or some other acceleration; here gravitational acceleration is assumed. The oscillating pendulum situation is depicted in FIG. 1 of the drawings. For small swings of the pendulum, the pendulum's frequency of oscillation does not depend on the amplitude of the oscillation but only on the length of the pendulum and the acceleration of gravity. The frequency, F, of oscillation of a pendulum in this case is predicted by the mathematical equation relationship $$F = \frac{1}{2\pi}\sqrt{\frac{g}{L}} \quad (1)$$

where g is the acceleration of gravity and L is the length of the pendulum. Note that the mass of the pendulum does not enter into Eq. 1.

In harmony with this underlying principle in the FIG. 1 drawing, a pendulum 100 having a mirror surface 102 on one face of its bob 103 is shown suspended from a fixed member 118 by the rotatable element of a loss makeup motor 104. When the pendulum bob 103 is in the position shown in FIG. 1, light energy from a fiber optic cable 112 (a cable optically coupled to a continuous light source) is communicated along the dotted line path 120 and 122 between the fiber-optic cable and the electrical energy generating solar cells 106 and 108. When the pendulum bob 103 is in its alternate extreme position, as shown at 126, light energy from the fiber-optic cable 112 is momentarily coupled along the path 122, 124 to the output fiber-optic cable 110. Optical components as represented by the lenses 114 and 116 may be used with the fiber-optic cables 110 and 112 as needed. Pulsed electrical energy from the solar cells 106 and 108 is communicated along the conductors 128 to the loss makeup motor 104 to maintain the pendulum in its oscillation condition.

From Eq. 1 it may be observed that a first one of the physical quantities measurable by the present invention, i.e., the acceleration of gravity, can be determined by measuring the frequency of oscillation of a pendulum such as the pendulum 100. Thus the accuracy with which the acceleration of gravity can be measured is dependent only on how accurately the geometry of the pendulum is known and how accurately the frequency can be measured. Because both frequency and geometry can be measured precisely, measuring the frequency of oscillation of a pendulum such as the pendulum 100 is an accurate way of measuring the acceleration of gravity or, for that matter, some other acceleration such as that of a vehicle moving in a curved trajectory.

Of course a swinging pendulum will eventually come to a stop because of energy losses, losses to friction and windage for example. Some way of making up for these losses is therefore required; moreover this makeup needs to be accomplished without altering the frequency of oscillation of the pendulum. This problem has been solved in every clock that uses a pendulum such as, once again, a cuckoo clock. In FIG. 1, energy to make up for the pendulum's losses is provided from the light input to the device, light which for the position of the pendulum shown, is illuminating the solar cells 106 and 108. The electrical energy generated by solar cells 106 and 108 may be used to give the pendulum a kick (an impulse) to maintain the oscillating condition. This maintenance occurs in a manner similar to that used in a clock so that the process of making up for the pendulum's losses does not alter the basic frequency of oscillation of the pendulum. This can be accomplished by making the energy input impulse short compared to the pendulum's period of oscillation. Note that since the input light is received on the solar cells for this position of the pendulum cycle a short electrical impulse is generated and also there is no light communicated to the device's output at the fiber-optic cable 110 during this impulse. A plurality of solar cells or other optical to electrical energy transducer devices may be used for this electrical energy generation; two solar cells are represented in the drawings of this document. Additionally, the input light is not limited as to its energy level and higher energy sources such as a laser are considered feasible for this service.

Figure 2:
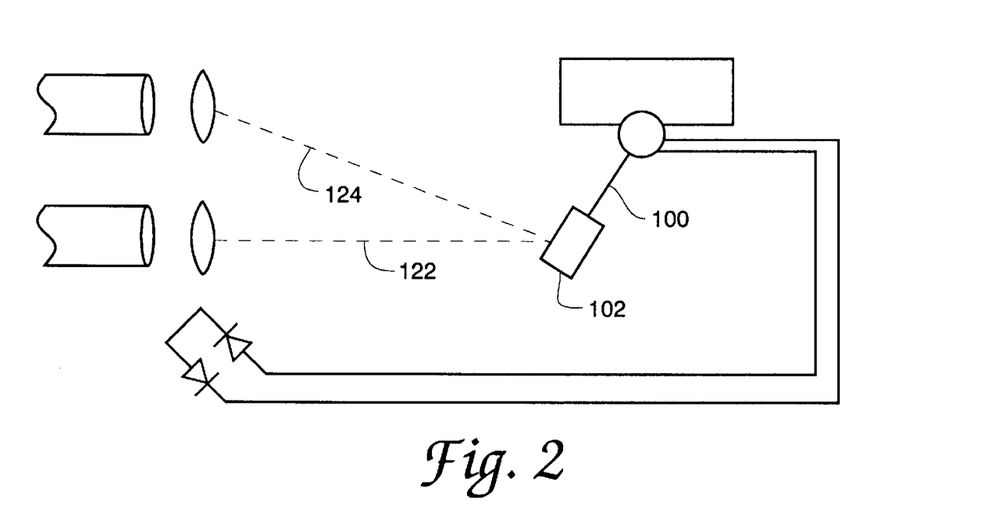
FIG. 2 shows the FIG. 1 system with its oscillating member in an alternate position.

Once the pendulum 100 is impulsed, as shown in FIG. 1, it will move according to its natural frequency (given by Eq. 1) to reach the position shown in FIG. 2. In this position input light no longer reaches the solar cells but rather goes to the output fiber-optic cable 110. As the pendulum 100 continues to oscillate it will again arrive in the position shown in FIG. 1. When it does, the light output will be zero and the pendulum will receive another impulse kick from the solar cells 106 and 108 to keep it oscillating. Thus the input light is time-shared between energy impulse generation and output signal carrier generation functions and light output intensity at the fiber-optic cable 110 varies from zero (no light) to a value equal to the input light intensity at a frequency equal to the frequency of the pendulum. Making the mechanical pendulum system as loss free as possible minimizes the light energy required to keep the pendulum oscillating.

Important characteristics of the pendulum system shown in FIGS. 1 and 2 and by extension the general optical acoustic oscillator measurement arrangement are:

- The frequency of oscillation of the pendulum (a mechanical oscillator) depends only on its geometry and the quantity to be measured, gravitational acceleration in the illustrated case;
- The duration of the kick to keep the mechanical oscillator pendulum oscillating must be short compared to the period of the pendulum's oscillation to insure the period of oscillation depends only on the quantity to be measured, i.e., on the acceleration of gravity, together with the geometry of the pendulum and not on light intensity;
- The frequency of oscillation of the mechanical oscillator pendulum does not depend on the intensity of the light input;
- The interface to the outside world is totally optical—a significant advantage of the present invention measurement arrangement;
- It is only the frequency of the optical output that is of interest and not the light intensity. This makes the measurement (of the acceleration of gravity in this case) independent of aging of the light source and independent of obstructions or dirt in the light path;
- The higher the frequency of oscillation of the mechanical oscillator pendulum, the faster its response time to changes in the quantity being measured. This makes the use of a solar cell to provide oscillator loss energy makeup in electrical form superior to alternatives. Generally, electrical time constants are much shorter than alternatives such as thermal time constants.

Figure 3:
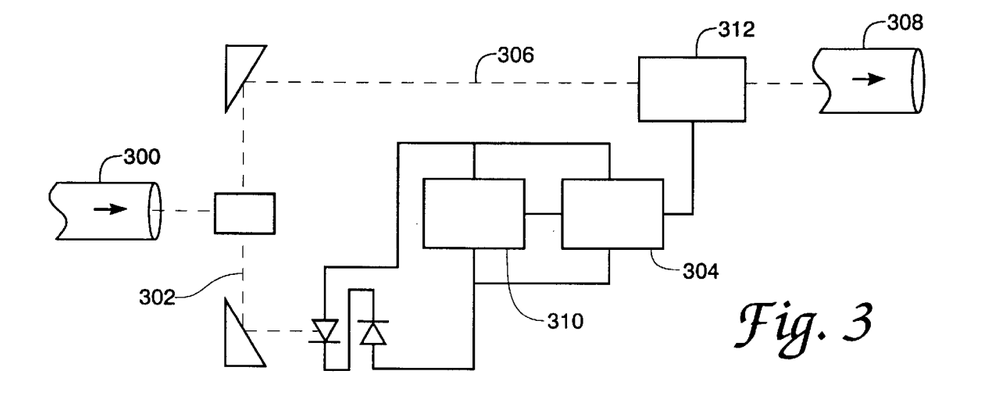
FIG. 3 shows a different optical output measurement apparatus.

By way of contrast the herein espoused optical acoustic oscillator measurement system fundamentally differs from the arrangement shown in FIG. 3 for producing a sensor with an optical interface and an output independent of light intensity. In the FIG. 3 system a continuous light source from a fiber-optic cable 300 is split into two paths, one for output signal generation and one for energy sourcing. The light following the path 302 illuminates solar cells to produce electrical energy for the sensor. The analog electrical output of the sensor is converted to frequency by a voltage to frequency converter 304 and this electrical signal is used to modulate the light following the second path 306. This modulated light is the output of the sensor at the output fiber-optic bundle 308. An advantage of the present invention optical acoustic oscillator measurement arrangement over this FIG. 3 straightforward scheme is that it requires less light energy to operate since the light is only used to make up the energy loss of a high Q oscillator and need not also energize the electrical circuits of blocks 304, 310 and 312 in the contrasting system in FIG. 3.

Refractive Measurement

To measure a time varying quantity, the frequency of the present invention optical acoustic oscillator should be higher than the highest frequency content of the quantity to be measured. Thus for a sensor with a 100 kHz bandwidth, an oscillator with a frequency of about 1 MHz is desirable. An example of a mechanical oscillator that can oscillate at this frequency is found in a piezoelectric device. Two potential examples of such a piezoelectric device are found in an optical acoustic oscillator employing a piezoelectric vibrating beam waveguide and an optical acoustic oscillator employing a piezoelectric reflective diaphragm as the mechanical oscillator and light steering elements. Such electromechanical actuators can be made of a piezoelectric material or other structure that causes the waveguide or optically reflective diaphragm to deform mechanically with application of an electric field.

The operation of an optical acoustic oscillator measurement arrangement using an optical waveguide employs many of the same principles as the optical acoustic oscillator measurement arrangement using an optically reflective diaphragm, though it uses refractive optics instead of reflective optics. There are in fact sufficient differences between these two implementations of the present invention measurement arrangement as to justify describing each separately; it is believed, however, that reflective optics provide the simplest implementation of the invention in most sensor applications.

Figure 4:
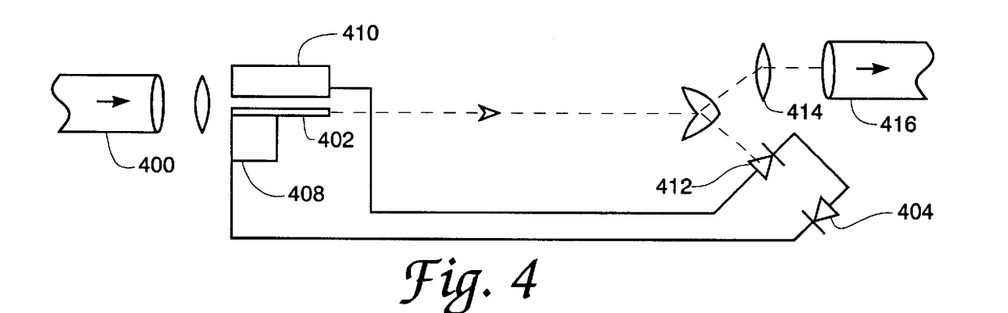
FIG. 4 shows a refraction-based measurement apparatus according to the invention with its vibrating element in a first position.

The refractive embodiment of an optical acoustic oscillator measurement arrangement combines a solar cell with an optical waveguide made of either a piezoelectric material or other structure that causes the waveguide to deform mechanically with the application of an electrical signal. An arrangement of this type is shown in FIG. 4 of the drawings. In this arrangement a continuous light source whose output passes through the optical waveguide 402 energizes the solar cells 404 and 406 when no electric field is applied to the optical waveguide. When the solar cell is being energized there is no light output signal from the optical acoustic oscillator. The voltage from the solar cells is then used to create an electric field in the optical waveguide structure 402. This electric field causes the optical waveguide to deform, preventing the light from reaching the solar cell and sending the light to the optical acoustic oscillator's output. This in turn removes the electric field from the optical waveguide structure allowing the waveguide to return to its original shape and position.

With the waveguide 402 in original shape and position, the solar cells again receive light from the continuous light source. This in turn results in no oscillator output. The voltage from the solar cells then again generates an electric field to deform the waveguide 402. As before, when this happens the optical waveguide deforms sending the light to the output of the optical acoustic oscillator instead of to the solar cells. Thus the waveguide oscillates mechanically causing the light intensity output of the optical acoustic oscillator to vary with the same mechanical frequency as the oscillation. If the electrical time constants of the system are much shorter than the mechanical time constants of the system, the frequency of oscillation will be determined solely by the mechanical properties of the waveguide 402. Such electrical time constants are typically significantly faster than mechanical time constants. The slowest electrical time constant is probably associated with charge storage in the solar cells 404 and 406. If required, the slowness of the solar cells may be addressed by adding circuitry to the solar cell output.

FIG. 4 in the drawings therefore shows a schematic diagram of an implementation of the refractive arrangement of an optical acoustic oscillator measurement arrangement. In this drawing, light from a continuous light source enters through the fiber optic cable 400 at the left side of the page. The elastic optical waveguide 402 is arranged as a simple beam, which is free at one end and rigidly held at the other end. In FIG. 4 the solar cells 404 and 406 are shown as two diodes connected in series with their electrical output being connected to the plates 408 and 410 of a simple capacitor transducer. One plate 408 of the capacitor transducer is bonded to the simple beam optical waveguide 402. The other plate 410 of the capacitor transducer is rigidly held above the waveguide beam. When the waveguide beam 402 is not deformed, as shown in FIG. 4, light from the continuous light source and the fiber-optic cable 400 energizes the solar cells 404 and 406 by way of the lenses 412 and 414 charging the capacitor transducer. In this non-deformed or neutral condition some light from the waveguide 400 also reaches the output fiber-optic cable 416 by way of the lenses 412 and 414.

Figure 5:
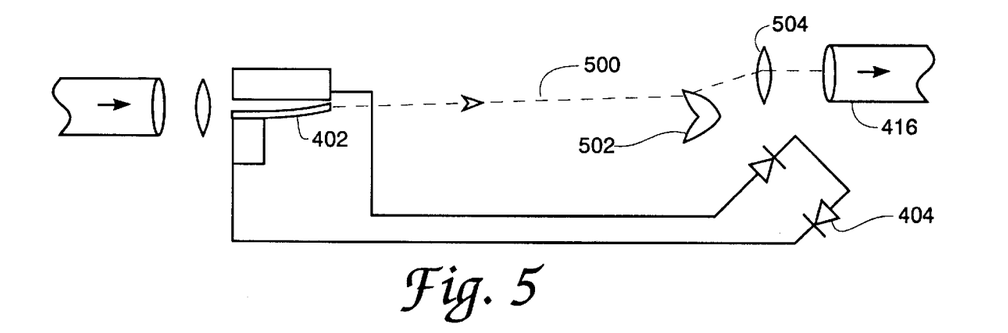
FIG. 5 shows a refraction-based measurement apparatus according to the invention with its vibrating element in a second position.

The electric field from the charge on the FIG. 4 capacitor plates, however, attracts the capacitor plate on the beam toward the rigidly held capacitor plate bending the optical waveguide upward. This causes the waveguide beam 402 to be lifted up so that no light shines on the solar cells 406 and 408. The bent or deflected position of the beam 402 is shown in FIG. 5. This figure shows the same schematic diagram of the optical acoustic oscillator measurement arrangement shown in FIG. 4 but with the beam 402 of the optical waveguide maximally deflected upward. In this beam position, the light from the fiber-optic cable 400 and the continuous light source no longer reaches the solar cells 404 and 406 but rather is directed along the path 500 to the lenses 502 and 504 and the output port or output fiber-optic cable 506 of the optical acoustic oscillator. When the waveguide beam is maximally bent upward the voltage on the capacitor transducer goes to zero since the solar cells 404 and 406 are not energized and the generated voltage is zero. With no voltage on the capacitor transducer plates 408 and 410 there is no force on the waveguide beam 402 so that the elastic stress in the beam forces it to swing down.

Figure 6:
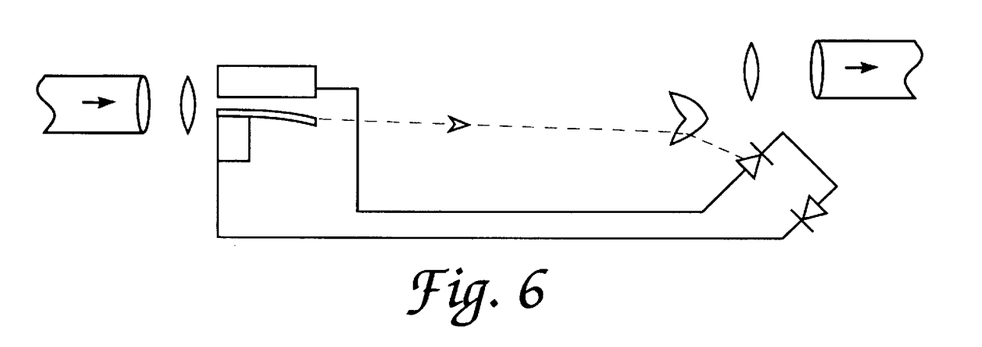
FIG. 6 shows a refraction-based measurement apparatus according to the invention with its vibrating element in a third position.

The inertia of the swinging beam will cause it to swing past the neutral position in FIG. 4 to the position shown in FIG. 6. Now the light shines on the solar cells 404 and 406 and the light output on the path 416 from the optical acoustic oscillator measurement arrangement is zero. With the solar cell again energized the electrical force adds to the elastic force to swing the beam up once again. This completes one cycle of the FIG. 4, FIG. 5 and FIG. 6 oscillator's operation.

The amount of energy required to sustain oscillation in the FIG. 4, FIG. 5 and FIG. 6 oscillator, which is shown to be obtained from the input light source, is small. This is attributed in part to the fact that the beam 402 structure tends to naturally oscillate or vibrate if excited and only the losses in the vibrating beam need to be made up from the light source energy. As indicated above, multiple solar cells and high-energy light sources are possible components of the FIG. 4 apparatus. Magnetic deflection of the beam 402 is also possible and is perhaps feasible when a single or few solar cells with the resulting limited total voltage output are employed at 404 and 406.

The frequency of the FIG. 4, FIG. 5 and FIG. 6 optical acoustic oscillator is in no way related to the frequency (and thus the wavelength) of the light employed as an energy source. The frequency of the oscillator is only marginally effected by the intensity of this light source. The frequency of the FIG. 4, FIG. 5 and FIG. 6 optical acoustic oscillator measurement arrangement output signal pulsations is determined primarily by the mechanical properties of the vibrating waveguide beam 402. The most important of these mechanical properties are the optical waveguide beam's mass, its elastic constant and the pre-stress in the beam due to external forces on the beam. The pre-stress in the beam affects the beam's natural frequency of vibration because of the nonlinear stress-strain relationship of the beam material. If the beam material were perfectly linear there would yet be a variation in the duty cycle of the light intensity output because the beam would vibrate around a nonzero stress position of the beam element. The capacitor force transducer shown in FIGS. 4, FIG. 5 and FIG. 6 may also be replaced by a piezoelectric force transducer without altering the basic operation of the oscillator. The choice of transducer is driven by the requirements of the application, such as cost or temperature of operation.

The optical acoustic oscillator measurement arrangement shown schematically in FIGS. 4–6 also illuminates some details that may be addressed to design a specific refractory optical acoustic oscillator measurement arrangement. One of these details concerns the amount of beam deflection needed to switch the light from the solar cells to the oscillator's output port. This deflection is preferably made as small as possible to enable high frequency oscillator operation. This requirement in turn necessitates a somewhat large distance and some optical energy loss from the beam source to the solar cells and the output fiber-optic cable when compared with the optical waveguide beam's width. Possible dimensions are shown in FIG. 6.

For the FIG. 4, FIG. 5 and FIG. 6 oscillator to be stable, the voltage from the solar cells should also be stable, even though this is a second order effect. Solar cells have a diode electrical characteristic so their output voltage tends to be somewhat independent of temperature and light intensity. If greater optical acoustic oscillator frequency stability is required than can be achieved with the natural characteristics of solar cells, the output voltage of the cells can be regulated.

Another factor meriting consideration in the design of a specific optical acoustic oscillator measurement arrangement concerns the algorithm or the arrangement used to cause output light intensity variation to depend on each of the quantities being measured. A concept usable for measuring current, for example, is a later topic of this specification. For measuring fluidic or hydrostatic or dynamic pressure, for another example, a beam material with a nonlinear stress-strain relationship can be used to obtain a frequency responsive to a pressure input signal. According to another approach, a linear material may be caused to oscillate around a shifted equilibrium position. This in turn changes the duty cycle of the output light intensity variation.

Reflective Measurement

Figure 7:
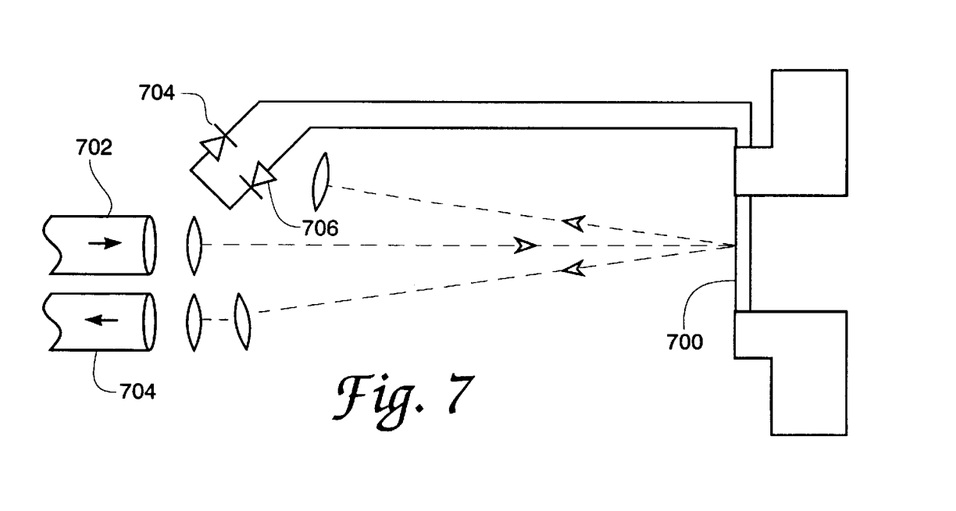
FIG. 7 shows a reflection-based measurement apparatus according to the invention with its vibrating element in a first position.

An alternative to the refractive optics implementation of the optical acoustic oscillator measurement arrangement, shown schematically in the preceding FIGS. 4–6 drawings, employs a reflective optics implementation. Such a reflection-based optical acoustic oscillator measurement arrangement is in fact represented in the conceptual apparatus discussed in connection with FIG. 1 and FIG. 2 above. A schematic diagram of a somewhat more practical basic reflective optical acoustic oscillator measurement arrangement is shown in FIG. 7 of the drawings. In FIG. 7 a piezoelectric diaphragm 700 (other electromechanical actuators could also be used) is coated with a light reflecting coating on the side of the diaphragm facing the light input from fiber-optic cable 702. The diaphragm 700 is mechanically constrained along its edges but is otherwise free to move and in particular is free to vibrate in oil can fashion. Depending on the deflection of the diaphragm, the light received by the optical acoustic oscillator is reflected to the solar cells 706 and 708 or to the optical acoustic oscillator's output fiber-optic cable 704.

Figure 8:
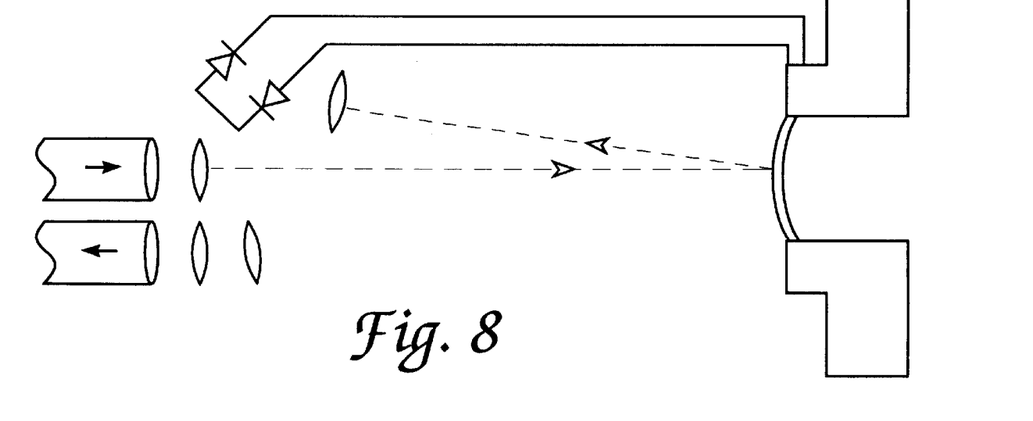
FIG. 8 shows a reflection-based measurement apparatus according to the invention with its vibrating element in a second position.

To appreciate the FIG. 7 oscillator, consider first the piezoelectric diaphragm 700 being deflected so that it reflects input light to the solar cells 706 and 708. This situation is shown in FIG. 8 and is the state of the oscillator where there is no light output provided from the oscillator output fiber-optic cable 704. In this condition the solar cells 706 and 708 are energized and apply a voltage to the piezoelectric diaphragm 700. The polarity of this electrical voltage is made to create an electrical force tending to bend the diaphragm in the opposite direction to that shown in FIG. 8. This electrical force combined with the elastic force of the diaphragm material causes the diaphragm 700 to swing back from the illustrated position and toward the position shown in FIG. 9. With the piezoelectric diaphragm in the position shown in FIG. 9 the input light is reflected to the output fiber-optic cable 704. There is no light on the solar cell in the FIG. 9 condition and thus the generated electrical force is zero. Elastic force will now deform the diaphragm back to the state shown in FIG. 8 to continue the oscillation cycle.

Figure 9:
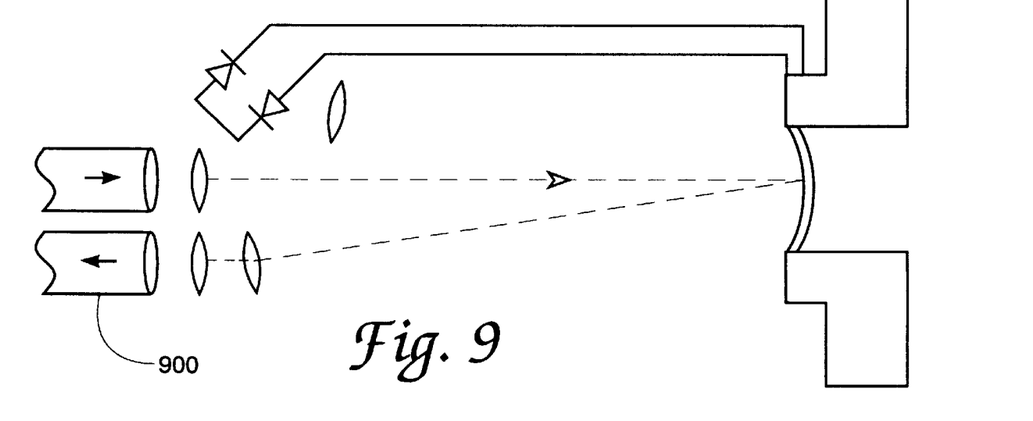
FIG. 9 shows a reflection-based measurement apparatus according to the invention with its vibrating element in a third position.

As with the FIG. 4, FIG. 5 and FIG. 6 optical acoustic oscillator measurement arrangement using refractive optics, the FIG. 7, FIG. 8 and FIG. 9 optical acoustic oscillator measurement arrangement using reflective optics requires minimal energy to maintain the oscillation. Again the source of this energy is the input light source and the low energy requirement means a relatively low power light source may be sufficient. This is because the piezoelectric diaphragm naturally oscillates if excited and only the losses in the vibrating diaphragm need to be made up from light source energy. Again the frequency of the optical acoustic oscillator is in no way related to the frequency (and thus the wavelength) of the light employed and the frequency of the oscillator is only marginally effected by the intensity of the light source. The frequency of the FIG. 7, FIG. 8 and FIG. 9 optical acoustic oscillator is determined primarily by the mechanical properties of the vibrating diaphragm. The most important of these properties are the diaphragm's mass, its elastic constant, and the pre-stress in the diaphragm due to external forces. With use of the piezoelectric actuator the time constant of the solar cells is less important since a piezoelectric device can oscillate in response to a DC source.

Electrical Current Measurement

Figure 10:
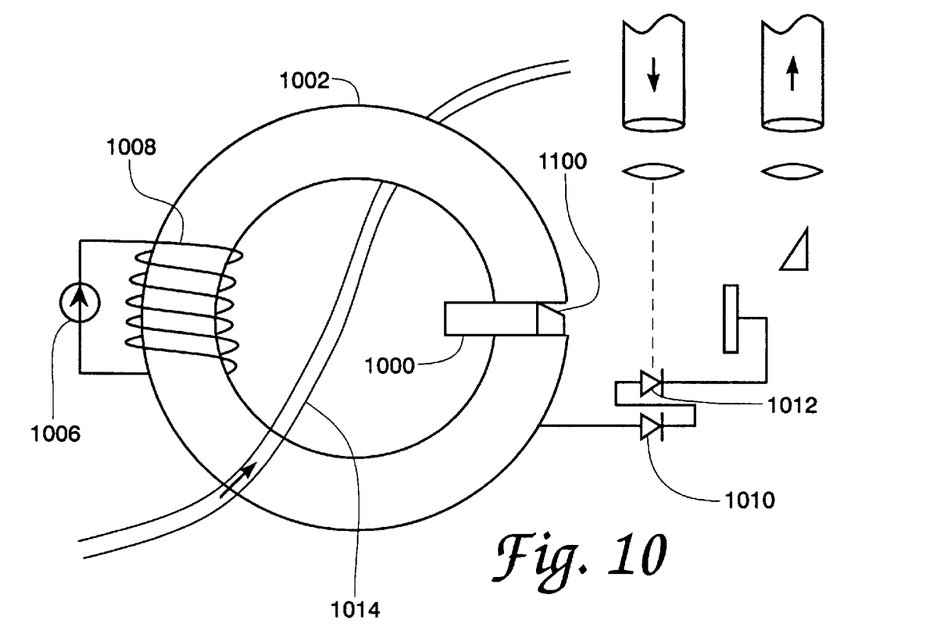
FIG. 10 shows an electrical current measurement apparatus according to the invention with its vibrating element in a first position.

A schematic diagram of an oscillatory measurement arrangement, a magnetic oscillator, usable to measure current flow is shown in the FIG. 10 drawing. In the FIG. 10 magnetic oscillator, a piece of soft magnetic iron, a yoke element 1000, slides back and forth in the air gap 1004 of a magnetic core such as the toroid 1002. In FIG. 10 the yoke 1000 moves in the horizontal or x direction as shown. The permeability of the sliding yoke iron is assumed to be $\mu$ while the permeability of the magnetic core is assumed to be infinity to simplify the following theoretical analysis. These assumptions appear reasonable since only the concept is important here. If the sliding magnetic iron yoke 1000 is in the position shown in FIG. 10, where it is left of the air gap center, a magnetic force created by the two currents i and $I_b$ (the current to be measured in conductor 1014 and a bias current from the source 1006 respectively) produces a magnetic field tending to pull the magnetic yoke 1000 back into the air gap 1004. This is a force deemed to be in the plus x direction and is of force magnitude predicted by $$Fx = \frac{l(\mu - \mu_o)}{2g}i^2 + \frac{l \cdot N^2(\mu - \mu_o)}{2g}I_b^2 + \frac{l \cdot N(\mu - \mu_o)}{g}I_b \cdot i \quad [2]$$

when the fringing field is neglected. Here l is the height of the core into the page, g is the length of the air gap 1004, N is the number of turns in the bias coil 1008, $I_b$ is the current from source 1006 in the bias coil 1008, and i is the conductor 1014 current to be measured. Typically the oscillator is arranged so that $N \cdot I_b \gg i$ and $\mu \gg \mu_o$ so that the force developed is approximately according to the simplified relationship $$F_x = \frac{l \cdot N^2 \mu}{2g}I_b^2 + \frac{l \cdot N \mu}{g}I_b \cdot i. \quad [3]$$

Figure 11:
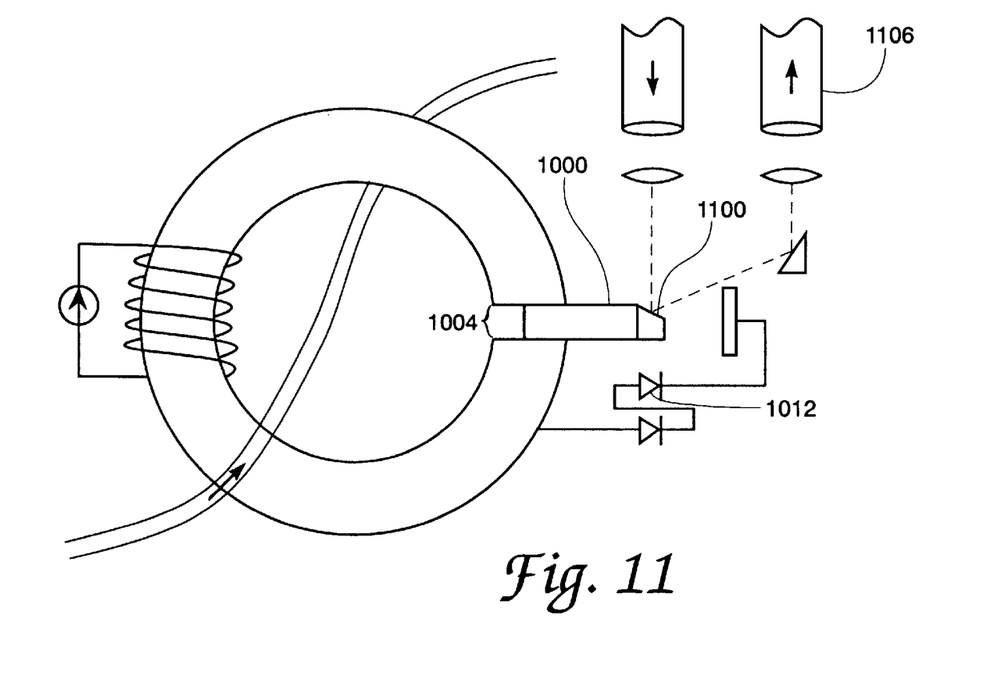
FIG. 11 shows the FIG. 10 measurement apparatus with its vibrating element in a second position.

If the sliding magnetic iron yoke 1000 is in the position shown in FIG. 11, where it is to the right of center of the air gap 1004, there is a magnetic force created by the two currents i and $I_b$ that again pulls the magnetic yoke 1000 back into the air gap. For this position of the yoke 1004 the force has the magnitude as given in Eq. 3, but now the force is negative. Thus no matter what position the yoke is in, the magnetic field pulls it back into the air gap. This means that if the magnetic yoke is pulled off of center it will oscillate about the equilibrium position of being centered in the air gap. The frequency of oscillation of this oscillator is predicted by the relationship $$F = \frac{1}{4}\sqrt{\frac{\frac{l \cdot N^2 \mu}{2g}I_b^2 + \frac{l \cdot N \mu}{g}I_b \cdot i}{2M \cdot Xo}} \quad [4]$$

and depends on the current i to be measured. It also depends on the geometry, the bias current, the yoke's mass M and the initial position of the yoke $X_o$. The magnetic field produced by the bias current is now playing the role that gravity played in the pendulum oscillator of FIG. 1. A nonmagnetic mirror 1100 is attached to the end of the magnetic yoke 1004 so that if the yoke is in the position shown in FIG. 10 light shines on the solar cells 1010 and 1012 and energizes the toroid magnetic circuit to pull the magnetic yoke to the right. Thus the magnetic oscillator's losses are offset by optical energy input. In this rightmost position of the yoke 1004 there is no light output from the FIG. 10 optical acoustic oscillator. If the magnetic yoke is in the position in FIG. 11 the mirror 1100 reflects the input light energy to the optical acoustic oscillator's output port, i.e., to the fiber-optic cable 1106. Thus the intensity of the light from the FIG. 10 and FIG. 11 magnetic optical acoustic oscillator varies from zero to a maximum value at a frequency equal to the frequency of oscillation of the magnetic components.

The magnetic oscillator-based optical acoustic oscillator possesses similar desirable characteristics as the pendulum or diaphragm-based optical acoustic oscillator in that:

The frequency of oscillation of the sliding magnetic yoke only depends on its geometry and the quantity to be measured which in this case is the current i. In Eq. 4 the frequency of oscillation also depends on the initial position of the magnetic yoke. This is an artifact resulting from the simplification of ignoring the fringing field.

The frequency of oscillation of the magnetic oscillator does not depend on the intensity of the light energy input;

The duration of the kick to keep the magnetic yoke oscillating must be short compared to the period of the yoke's oscillation to insure the period of oscillation only depends on the quantity to be measured (the current i), the magnetic yoke's mass, the geometry of the system, and the bias current and not on the light intensity;

The interface to the outside world is totally optical;

It is only the frequency of the optical output that is of interest and not the light intensity. This makes the measurement (of the current i in this case) independent of aging of the light source and independent of dirt or obstruction in the light path which will alter the light's intensity.

Figure 12:
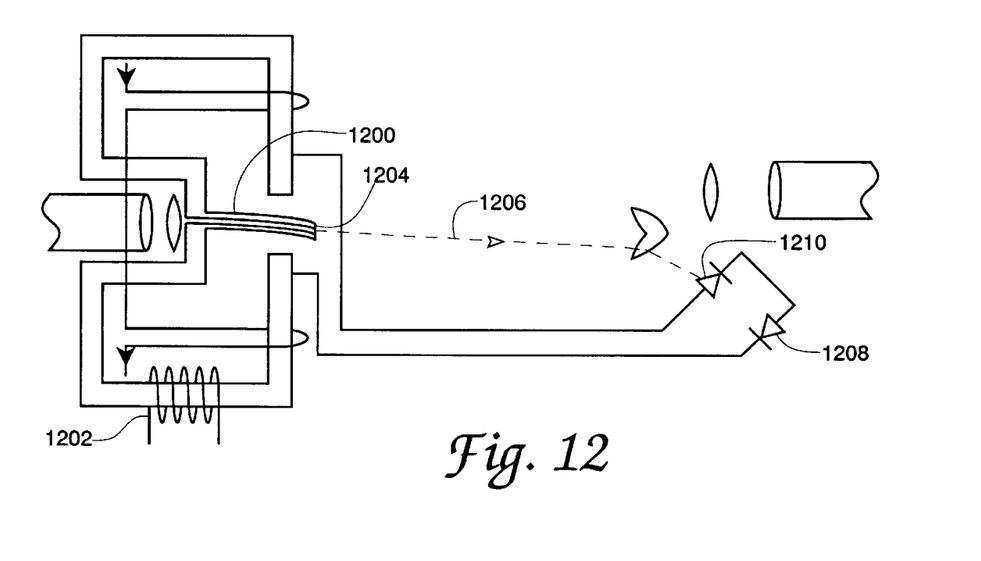
FIG. 12 shows an alternate electrical current measurement apparatus according to the invention with its vibrating element in a first position.
Figure 13:
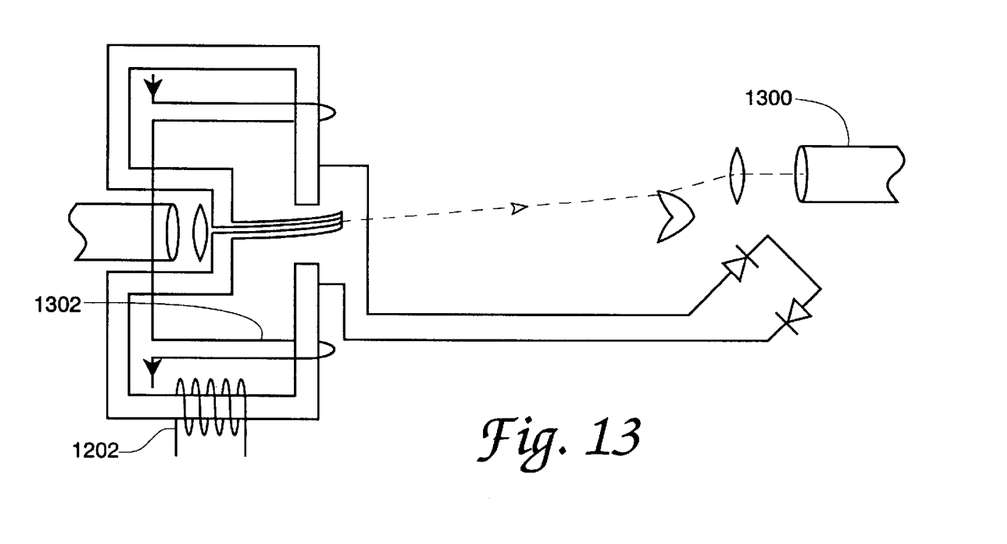
FIG. 13 shows the FIG. 12 measurement apparatus with its vibrating element in a second position.

An alternately arranged magnetic oscillator-based current measurement arrangement is shown in the FIG. 12 and FIG. 13 drawings. Here a vibrating beam 1200 is coated with a soft magnetic material. The magnetic force on the beam is zero in the equilibrium position. If the beam moves up or down, however, the magnetic force will be in that same direction as the motion with a value predicted by the relationship $$fe = \mu_o A \left\{ \frac{N^2 l \cdot x}{\left(\frac{l}{2} - x\right)^2 \left(\frac{l}{2} + x\right)^2} \right\} I^2 \quad [5]$$

where $\mu_o$ is the permeability of free space, l is the spacing between the flexible beam and the magnetic pole, A is the area of the magnetic pole, I is the current to be measured, N is the number of turns per pole, and x is the deformation of the beam from its equilibrium position. Linearizing equation 5 and solving for the oscillator's frequency gives $$F = \sqrt{\frac{M}{K - \frac{\mu_o A l N^2 I^2}{(l/2)^4}}} \quad [6]$$

where K is the elastic constant of the flexible beam.

A bias coil 1202 may be used here as in the above case to enable measurement of plus and minus currents. In the FIG. 12 position of the vibrating beam 1200, a mirror 1204 on the beam end reflects light along the path 1206 to the solar cells 1208 and 1210; while in the position shown in FIG. 13 the mirror 1204 reflects light to the output fiber-optic cable 1300. Current flowing in the winding path 1302 again alters the frequency of the vibrating beam.

Fluidic Pressure Measurement

Figure 14:
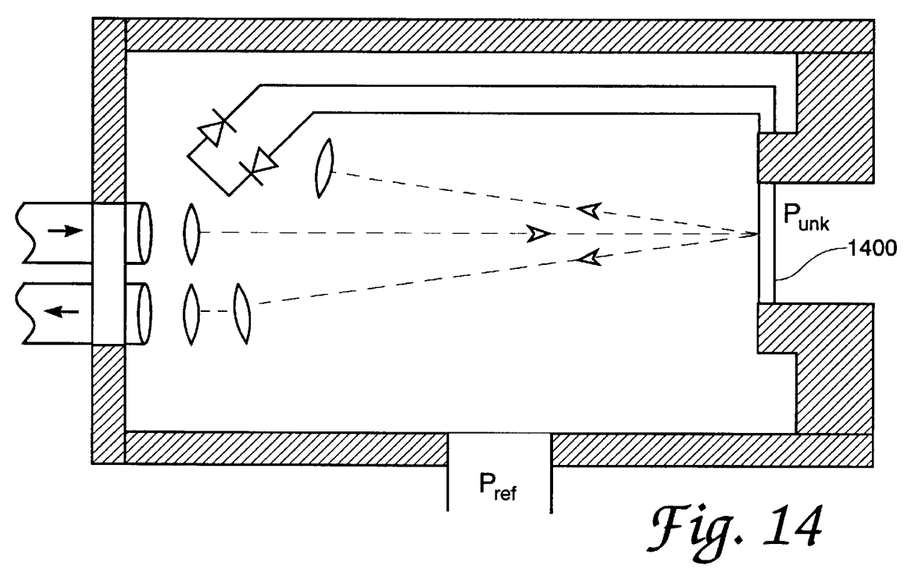
FIG. 14 shows fluidic pressure measurement apparatus according to the invention.

A significant use of the optical acoustic oscillator measurement arrangement is believed to involve its application in pressure sensor systems. A schematic diagram of such a sensing apparatus is shown in FIG. 14 of the drawings. In the FIG. 14 apparatus the difference in pressure across the light reflective material coated piezoelectric diaphragm 1400 stresses the diaphragm changing the mechanical oscillation frequency of the diaphragm according to a nonlinear stress-strain relationship. This in turn changes the optical acoustic oscillator's output light intensity variation frequency. It is the change in the optical acoustic oscillator's output frequency that is the measure of the change in pressure across the piezoelectric diaphragm. This will again be a stable quantity that does not depend on light intensity or the wavelength of the light but only on the mechanical properties of the piezoelectric diaphragm. Alternatively, for a linear diaphragm material, the duty cycle of the optical acoustic oscillator's output light intensity variation changes for a different reason, i.e., because of shift in the equilibrium position of the diaphragm, the position the diaphragm oscillates around. This new equilibrium position results from the pressure-induced stress in the diaphragm material.

Since it is frequency shift or duty cycle shift and not light intensity that is being measured, the pressure responsive optical acoustic oscillator measurement arrangement also provides a superior optical sensor. It is the fact that frequency (of the vibrating diaphragm) and not light level determines the output of the optical acoustic oscillator that makes the optical acoustic oscillator useful as a sensor for measuring different physical quantities.

Magnetic Field Measurement

Figure 15:
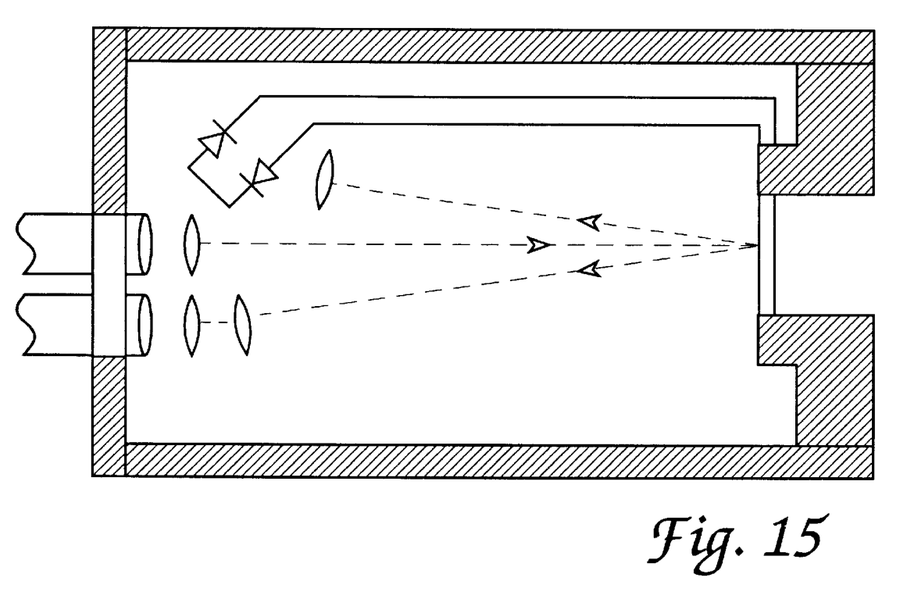
FIG. 15 shows a magnetic measurement apparatus according to the invention.

Another application of the optical acoustic oscillator measurement arrangement is to the determination of magnetic field strength. This usage enables an effective optics-based Hall effect sensor clone. The operating principle is similar to that used to measure pressure and a schematic of the concept is shown in FIG. 15. Here the piezoelectric diaphragm is coated on the outside with a thin layer of magnetized permanent magnet material. An external magnetic field exerts a force on this coating and thus on the diaphragm and thereby changes the frequency or duty cycle of the optical acoustic oscillator. Again this frequency or duty cycle shift is a measure of the physical quantity of interest. Since it is frequency shift or duty cycle shift and not light intensity that is being measured, the magnetic flux optical acoustic oscillator measurement arrangement also provides a desirable optical sensor and provides the optical output signal achieved in the above disclosed other applications of the invention.

Conclusions

Possible sensor applications for the optical acoustic oscillator measurement arrangement include:
   current sensor where an optical interface is desired:
      by the two implementations described above;
      by use of magnetic field sensor to measure the magnetic field produced by the unknown current in the air gap of a magnetic core;
      similar in results to commercial current sensors with the hall effect sensor replaced by an optical acoustic oscillator magnetic field sensor.
   magnetic field sensor where an optical interface is desired:
      via a thin layer of permanent magnet material deposited on the surface of an elastic optical waveguide;
      magnetic field produces a force that pre-stresses the elastic optical waveguide changing the oscillator frequency;
      magnetic field health effects studies.

pressure sensor where an optical interface is desired:
  pressure pre-stresses an elastic optical waveguide changing the oscillator frequency;
  optical microphone also possible.
accelerometer where an optical interface is desired:
  acceleration pre-stresses the elastic optical waveguide changing the oscillator frequency;
  automotive pre-ignition sensor.
electric field sensor where an optical interface is desired:
  similar in concept to the magnetic field sensor.
air pollution particulate sensor where an optical interface is desired:
  air pollutant particles deposit on the oscillating optical waveguide changing its mass and thus its frequency;
chemical sensor where an optical interface is desired:
  plastic film is deposited on oscillation member which absorbs chemical to be detected, film elasticity and mass change as chemical of interest is absorbed changing the oscillator frequency.

Fabrication of the optical acoustic oscillator measurement arrangement to be responsive to a number of different physical quantities is therefore possible. Both micro machining technology and traditional hybrid device fabrication technology are suited to the manufacture of such optical acoustic oscillator measurement systems. Systems of this type moreover avoid the electrical noise pickup and need for electrical isolation found in such applications as power electronics, automotive engine controls and accessories, and aircraft engine controls and accessories. The sensor which is the object of this invention has the advantage of an optical interface which eliminates electrical noise pickup by the sensor output and naturally provides an isolated connection to the outside world.

The disclosed optical acoustic oscillator measurement arrangement has the advantage of using light generated electrical energy to make up for mechanical oscillator losses. This means the optical acoustic oscillator can have a very high frequency of oscillation increasing its sensitivity and bandwidth. Oscillators, according to the invention, may be designed with different operating frequencies to enable output signal frequency multiplexing on a single optical fiber. Light per se is, however, not essential to operation of the oscillator; it serves only as an energy source and transmission medium. Microwaves, radio waves or even lower frequency electromagnetic sources are possible light alternatives.

While the apparatus and method herein described constitute a preferred embodiment of the invention, it is to be understood that the invention is not limited to this precise form of apparatus or method. Changes may be made therein without departing from the scope of the invention which is defined in the appended claims.

What is claimed is:

1. The optical coupled signal oscillatory method of measuring physical quantity changes between first magnitude and second magnitude values comprising the steps of:
  establishing light energy supported mechanical element oscillations of combined mechanical element physical attribute and physical quantity to be measured frequency determination;
  coupling a representation of oscillation frequency of said mechanical element oscillations by optical linking to a signal output port;
  measuring a change in said mechanical element oscillation frequency caused by change of said physical quantity to be measured between first and second magnitudes thereof; and
  correlating said measured change of mechanical element oscillation frequency with changes of said physical quantity to be measured according to a predetermined relationship criteria.

2. The method of measuring physical quantity changes of claim 1 wherein said physical quantity changes comprise one of a change in electrical current, a change in fluidic pressure, a change in physical acceleration, a change in magnetic flux density and a change in magnetic field strength.

3. The method of measuring physical quantity changes of claim 1 wherein said physical quantity to be measured is a fluidic pressure signal and said mechanical element oscillations are developed in a fluidic pressure responsive diaphragm member.

4. The method of measuring physical quantity changes of claim 1 wherein said step of establishing light energy coupled mechanical element oscillations includes supplying oscillation-sustaining energy to said oscillating mechanical element by way of an optical energy conveying path.

5. The method of measuring physical quantity changes of claim 4 wherein said supplying of oscillation-sustaining energy to said oscillating mechanical element by way of an optical energy coupling path includes supplying chopped optical energy modulated by said oscillating mechanical element.

6. The method of measuring physical quantity changes of claim 4 wherein said steps of supplying oscillation-sustaining energy and coupling a representation of oscillation frequency comprise time-sharing a single optical input signal.

7. The method of measuring physical quantity changes of claim 1 wherein said steps of establishing light energy supported mechanical element oscillations and coupling a representation of oscillation frequency include optically refracting an optical input signal in synchronism with said mechanical element oscillations.

8. The method of measuring physical quantity changes of claim 1 wherein said steps of establishing light energy supported mechanical element oscillations and coupling a representation of oscillation frequency include optically reflecting an optical input signal in synchronism with said mechanical element oscillations.

9. The method of measuring physical quantity changes of claim 1 wherein said steps of establishing light energy supported mechanical element oscillations and coupling a representation of oscillation frequency include one of the steps of communicating an optical energy signal through an oscillating time-sharing light transmission member and communicating an optical energy signal through an oscillating time-sharing reflection member.

10. The oscillatory mechanical element method of measuring a physical parameter input signal comprising the steps of:
  time-sharing an optical energy source input signal in chopping alternation between a mechanical oscillator element energy input and a measurement apparatus optical signal path;
  communicating a physical parameter to be measured input signal to a frequency determining component of said mechanical oscillator element;
  measuring a modulation frequency characteristic of a time-share-chopped optical signal from said measurement apparatus optical signal path; and
  relating time-share-chopped optical signal modulation frequency with successive values of said physical parameter input signal.

11. The oscillatory mechanical element method of measuring a physical parameter input signal comprising the steps of:
- time-sharing an optical energy source input signal in chopping alternation between a mechanical oscillator element energization and a measurement apparatus output optical signal energization;
- communicating a physical parameter to be measured input signal to a frequency selection element of said mechanical oscillator element;
- measuring a modulation frequency characteristic of a time-share-chopped optical signal from said measurement apparatus optical signal path; and
- relating time-share-chopped optical signal modulation frequency to successive values of said physical parameter input signal.

12. The oscillatory mechanical element method of claim 11 wherein said step of time-sharing an optical energy source input signal in chopping alternation includes modulating said optical energy source input signal via one of optical refraction and optical reflection.

13. The oscillatory mechanical element method of claim 11 further including the step of sustaining said mechanical oscillator element energization with periodic bursts of electrical energy generated from said time-shared optical energy source input signal.

14. The oscillatory mechanical element method of claim 11 wherein said communicating step includes energy passing through one of an oscillating diaphragm element and an oscillating beam element.

15. The oscillatory mechanical element method of claim 11 wherein said step of communicating a physical parameter to be measured input-signal to a frequency selection element includes changing a physical dimension of said frequency selection element.

16. An optically coupled light chopping mechanical oscillator physical measurement apparatus comprising the combination of:
- a mechanical oscillator element having an oscillatory member responsive in altered physical dimension and by altered mechanical oscillation frequency to an input signal representative of a physical input quantity to be measured;
- a light modulation element connected with said mechanical oscillator element and disposed in an optical signal input path of said apparatus, said light modulation element including a light steering element periodically coupling said optical signal input path with an oscillation-sustaining input port of said mechanical oscillator element and with an optical output signal path of said apparatus;
- frequency discrimination apparatus responsive to periodic pulsations of optical energy from said output signal path of said apparatus; and
- signal correlation apparatus responsive to frequency signals from said frequency discrimination apparatus and relating said frequency signals to change in said physical input quantity to be measured.

17. The optically coupled light chopping mechanical oscillator physical measurement apparatus of claim 16 wherein said mechanical oscillator element comprises of one of a mechanical diaphragm element and a mechanical beam element.

18. The optically coupled light chopping mechanical oscillator physical measurement apparatus of claim 16 wherein said light modulation element includes one of an optical reflector element and an optical refractor element.

19. The optically coupled light chopping mechanical oscillator physical measurement apparatus of claim 16 wherein said input signal represents one of the physical quantities of electrical current flow, fluidic pressure, magnetic flux density and linear acceleration.

* * * * *